United States Patent [19]
Brewer et al.

[11] Patent Number: 6,081,876
[45] Date of Patent: Jun. 27, 2000

[54] MEMORY ERROR CONTAINMENT IN NETWORK CACHE ENVIRONMENT VIA RESTRICTED ACCESS

[75] Inventors: Tony M. Brewer; David M. Patrick, both of Plano, Tex.

[73] Assignee: Hewlett-Packard Company, Palo Alto, Calif.

[21] Appl. No.: 08/935,242

[22] Filed: Sep. 22, 1997

[51] Int. Cl.[7] ........................................ G06F 12/14
[52] U.S. Cl. .................. 711/163; 711/146; 711/121; 711/152
[58] Field of Search ............................. 711/1, 119, 121, 711/124, 141, 144, 145, 146, 148, 152, 153, 163, 164

[56] References Cited

U.S. PATENT DOCUMENTS

| | | | |
|---|---|---|---|
| 5,293,603 | 3/1994 | MacWilliams et al. | 710/129 |
| 5,355,467 | 10/1994 | MacWilliams et al. | 711/146 |
| 5,557,769 | 9/1996 | Bailey et al. | 711/146 |
| 5,652,859 | 7/1997 | Mulla et al. | 711/146 |
| 5,802,577 | 9/1998 | Bhat et al. | 711/146 |
| 5,845,071 | 12/1998 | Patrick et al. | 709/215 |

*Primary Examiner*—B. James Peikari

[57] ABSTRACT

A computer memory management system that allocates each node's network cache into protected and unprotected regions. Nodes are previously configured into error containment cluster of nodes (ECCNs). Unprotected network caches may encache data accessed from any node's unprotected memory. Protected network caches may encache data accessed from nodes that are within the same ECCN, but only from a node's protected main memory. Memory address allocation techniques known in the art enable the system to know whether a processor's request for data will be found in protected or unprotected memory. Under the present invention, a node is able to first refer to network cache (protected or unprotected, as appropriate) in locating the data. If the data is not in cache, then the system refers to main memory. The present invention thus enables superior memory access advantages of cache memory techniques. At the same time, in the event of a memory error, the present invention's protected/unprotected configuration contains the corruption caused by the error. Exemplary processing logic is also disclosed enabling the present invention in a preferred embodiment.

25 Claims, 3 Drawing Sheets

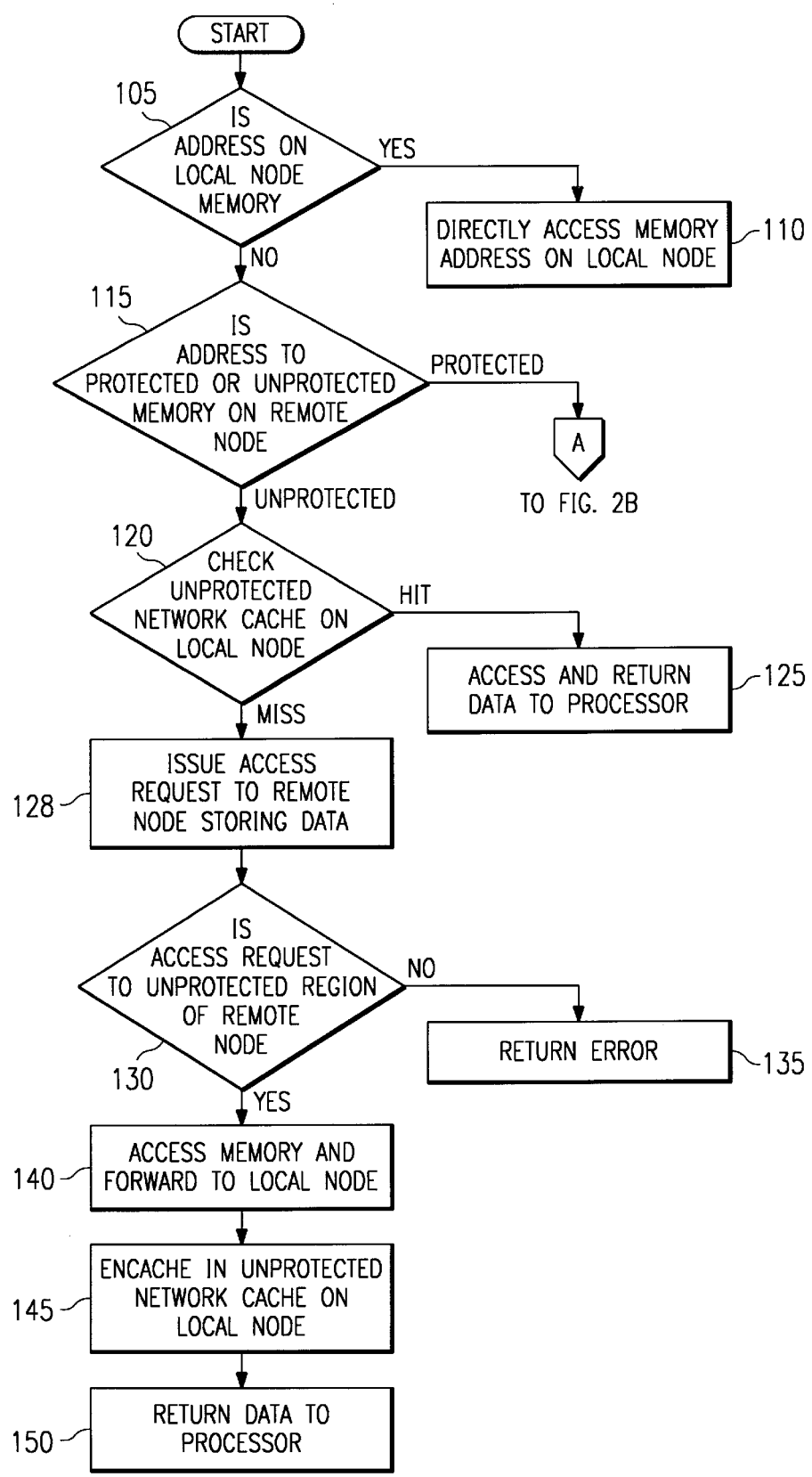

MEMORY ERROR CONTAINMENT IN NETWORK CACHE ENVIRONMENT VIA RESTRICTED ACCESS

TECHNICAL FIELD OF THE INVENTION

This invention relates generally to memory management in multiprocessor computer systems, and more specifically to a deployment of protected and unprotected network cache memory that combines the error containment advantages of protected memory and the rapid access advantages of network cache.

BACKGROUND OF THE INVENTION

When highly available multiprocessor systems experience memory errors, the contamination caused by those errors can be contained by dividing and partitioning nodes into error containment cluster nodes ("ECCNs"). As disclosed in co-pending, commonly assigned U.S. patent application "ERROR CONTAINMENT CLUSTER OF NODES," Ser. No. 08/720,368, filed Sept. 27, 1996, now U.S. Pat. No. 5,845,071, each ECCN is predefined as a discrete group of nodes. Each node within each ECCN is further defined to have protected and unprotected memory. Processors on nodes within each ECCN may write to and access any memory within their own ECCN, but may only write to and access the unprotected regions in nodes within other ECCNs. In this way, contamination caused by an error is limited just to the local ECCN and unprotected memory regions in remote ECCNs. Once such an error is detected, it is then possible to selectively purge and re-initialize just nodes and parts of nodes that have become contaminated.

Highly available systems of the current art also advantageously operate in a network cache environment. That is, each node has its own network memory cache for faster memory retrieval of frequently-referenced data. Data from any remote node may be taken from that remote node's main memory and encached in the local node's network cache. Processors requesting data not found on local node memory may then check the local network cache before issuing a request to a remote node for a memory access. If the data required by the processor happens to be in the local network cache, the data is then immediately available to the processor. This obviates the processor having to issue a remote memory access request, and so it can complete its task more quickly. Also, the processing overhead of issuing and satisfying a remote memory access request is saved.

A problem arises, however, when the network cache operating environment is implemented in a system using ECCN partitioning. Since under traditional network cache principles, all nodes have a network cache into which any other remote node can encache data, it follows that the ability of ECCN partitioning to limit error contamination in such an environment is severely compromised. The universally shared network caches prevent complete isolation of the protected regions within ECCNs.

There is therefore a need in the art for a system employing a network cache environment that can maintain the error containment advantages of ECCN partitioning. Under such a system, processing advantages of improved speed and overhead economy would still be enabled through availability of network cache, while error containment advantages would also be available in the event of a memory error.

SUMMARY OF THE INVENTION

These and other objects, features and technical advantages are achieved by a system and method which allocates each node's network cache into protected and unprotected regions. Nodes are previously configured into ECCNs. Unprotected network caches may encache data accessed from any node's unprotected memory. Protected network caches may encache data accessed from nodes that are within the same ECCN, but only from a node's protected main memory.

Memory address allocation techniques known in the art enable the system to know whether a processor's request for data will be found in protected or unprotected memory. Under the present invention, a node is able to first refer to network cache (protected or unprotected, as appropriate) in locating the data. If the data is not in cache, then the system refers to main memory. The present invention thus enables superior memory access advantages of cache memory techniques.

At the same time, in the event of a memory error, the present invention's protected/unprotected configuration contains the corruption caused by the error. If an error occurs in a node's unprotected memory, then only (1) that ECCN's entire main memory; (2) unprotected main memory on all other nodes; and (3) unprotected cache on all nodes have to be purged and reinitialized. If an error occurs in a node's protected memory, then only (1) that ECCN's entire main memory; (2) unprotected main memory on all other nodes; and (3) protected caches of nodes in that ECCN have to be purged and reinitialized.

Exemplary processing logic is also disclosed enabling the present invention in a preferred embodiment.

It is therefore a technical advantage of the present invention for each node to have both protected and unprotected regions of network cache memory, wherein an error in memory can be contained to necessitate a purge and reinitialization of either all nodes' unprotected cache, or selected nodes' protected cache, but not both.

It is a further technical advantage of the present invention to nonetheless enable processors to access frequently-used data rapidly via cache configured according to the invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2A and 2B are flow charts illustrating exemplary logic enabling the present invention in a preferred embodiment.

DESCRIPTION OF THE PREFERRED EMBODIMENTS

Figure 1:
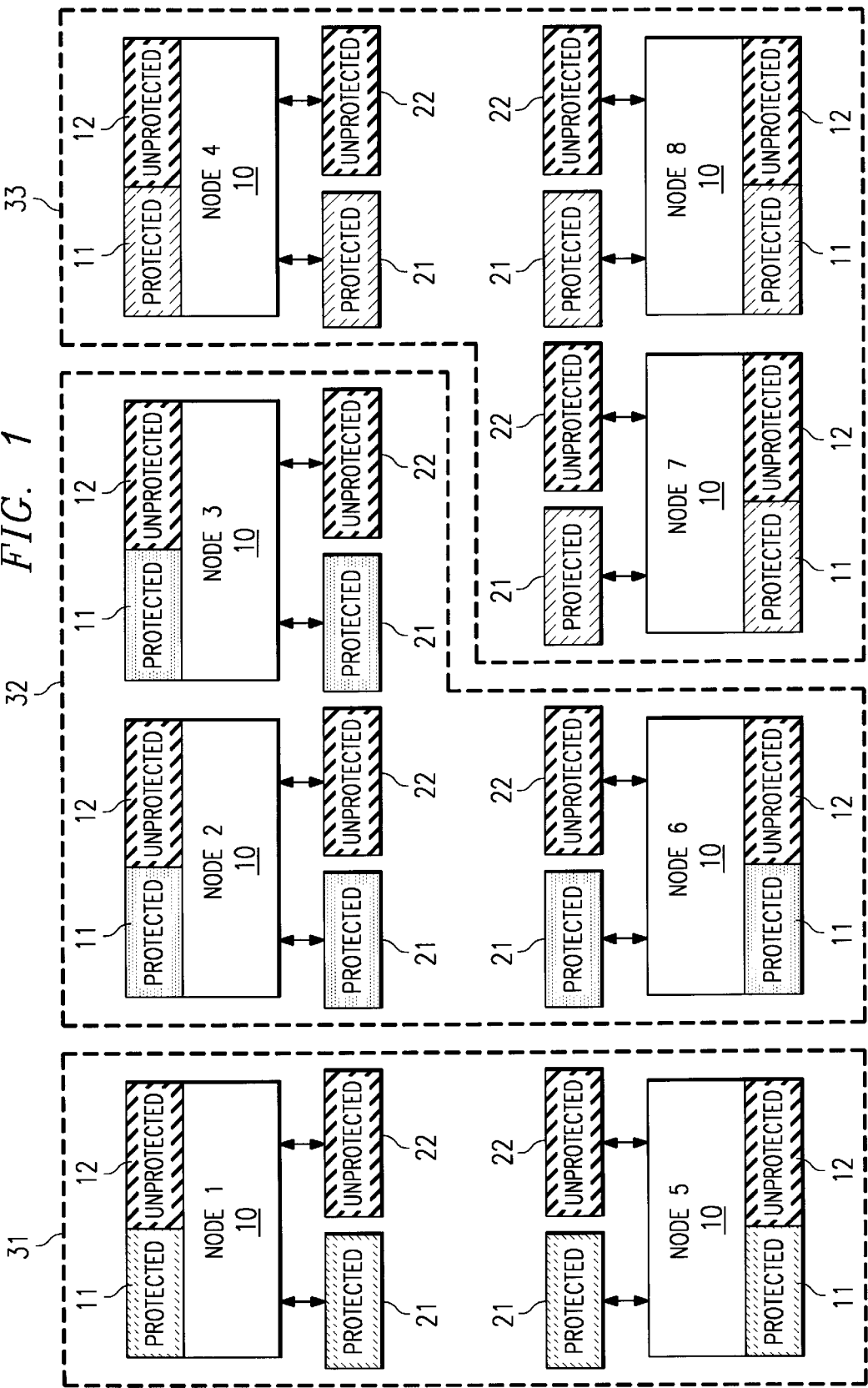
FIG. 1 illustrates the allocation of protected and unprotected regions of network cache among nodes according to the present invention.

With reference to FIG. 1, a preferred embodiment of the present invention has main memory on each node 10, each node 10's main memory divided into protected and unprotected regions 11 and 12. According to the disclosure of above-referenced U.S. patent application ERROR CONTAINMENT CLUSTER OF NODES, nodes 10 are partitioned into discrete ECCNs 31, 32 and 33. A processor on a local node may access or write to any memory address on any node 10 within its own ECCN (both protected and unprotected regions 11 and 12), but may only access or write to addresses in unprotected regions 12 of nodes 10 in other ECCNs. In this way, contamination due to memory errors can be contained to just nodes within the ECCN housing the node with the error, plus unprotected regions 12 of nodes 10 on other ECCNs.

With continuing reference to FIG. 1, the preferred embodiment also provides network cache memory. Each node 10 has its own network cache divided into a protected cache 21 and an unprotected cache 22. Only nodes 10 within the same ECCN 31, 32 or 33 may encache data (and then only protected data) in protected caches 21 for a particular node 10. For example, Node 8 on FIG. 1 may encache data (but only protected data) in protected caches 21 for nodes 4 and 7, because nodes 8, 4 and 7 are in a common ECCN 33. Node 8 may not encache data, however, in protected cache 21 for nodes 1, 2, 3, 5 or 6 because these nodes are in different ECCNs.

In contrast, each node 10's unprotected memory 12 is generally available. Any node 10 may encache in its unprotected cache 22 the unprotected memory of any other node 10 (but only unprotected data).

The structuring of network cache in this way allows the benefits of protected/unprotected memory principles in ECCNs (such as disclosed in above-referenced U.S. patent application ERROR CONTAINMENT CLUSTER OF NODES) to be extended into a network cache environment. If a memory error occurs in a particular node 10's unprotected region 12, then only that ECCN, the unprotected regions 12 of other ECCNS, and the unprotected caches 22 of all nodes have to be purged and re-initialized. Similarly, if a memory error occurs in a particular node 10's protected region 11, then only that ECCN, the unprotected regions 11 of other ECCNS, and the protected caches 21 of that ECCN have to be purged and re-initialized.

While still availing itself of the error containment advantages described above, therefore, network cache according to the present invention still offers the benefits of substantial cache memory sharing by all nodes. As noted, all nodes share unprotected network cache, and nodes on the same ECCN share protected network cache. This improves the speed of processing by making frequently-used memory references available in cache, as well as reducing processing overhead by cutting down the number of remote node main memory requests.

A preferred embodiment of the present invention has been implemented on a Hewlett-Packard SPP2000 computer system, although it will be appreciated that the invention may be implemented on any highly available multiprocessor system having multiple nodes sharing network cache. In the preferred embodiment, enablement typically begins with a processor on the local node issuing a request for a memory reference. Memory address space on the system has already been configured using virtual and physical space allocation techniques standard in the art. The system can thus determine from the processor's request whether the address satisfying the reference can be found on the local node or on a remote node, and if on a remote node, the identity of the remote node. Nodes on the system have further already been preconfigured into ECCNs, and protected/unprotected regions have been predefined. Therefore, if the system determines that the processor reference is to a particular remote node, it can further identify whether the address is in protected or unprotected memory, as well as ascertaining the ECCN in which the remote node resides.

Memory request processing logic receives this information (node ID, protected/unprotected, ECCN) in the form of the condition of specific bits in memory request transaction. In a preferred embodiment, the processing logic then follows a sequence as illustrated in the flow charts depicted on FIGS. 2A and 2B.

With reference to FIG. 2A, processing logic starts by determining first whether the memory address responsive to the processor request is on local node memory (block 105). If it is on local node memory, then that local node memory can be addressed directly, and the data returned to the processor (block 110).

Assuming that the address is on a remote node, processing logic next determines whether the address is to protected or unprotected memory on the remote node (block 115). If it is to the unprotected region, the processing logic next checks to see if the required data is already in the local node's unprotected cache (block 120).

A hit in the unprotected cache on the local node causes that cache to be accessed, allowing the data to be returned to the originating processor (block 125). A miss in the network cache, however, causes the processing logic to issue an access request to the remote node storing the data (block 128). The logic next confirms that the address requested by the local node is actually in an unprotected region memory on the remote node (block 130). If it is not, an error condition is detected (block 135), advantageously precipitating an interrupt to the original requesting processor on the local node advising the processor of the error condition. On the other hand, if the address is confirmed to be in an unprotected region of the remote node's main memory, that memory is accessed, and the data is forwarded to the originating processor on the local node (block 140). This data is then encached in the local node's unprotected cache (block 145), and the data is returned to the processor (block 150).

Figure 2B:
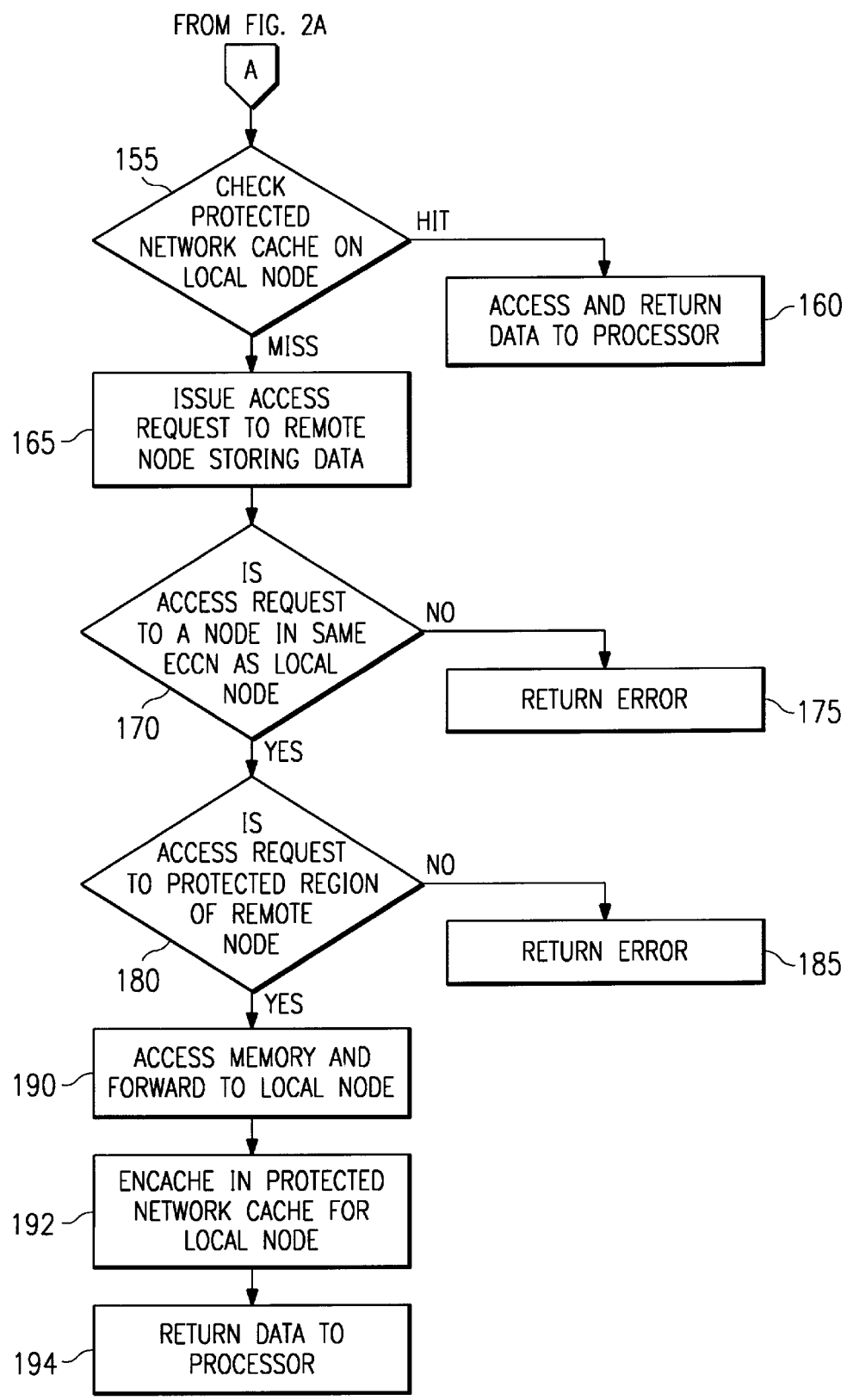

Returning back to block 115 on FIG. 2A, a different sequence applies if the processing logic determines that the address responsive to the originating processor's request is in protected memory on the remote node. With reference now to FIG. 2B, the processing logic first checks to see if the required data is in the protected cache on the local node (block 155). A hit causes the local protected cache to be accessed, and the data to be returned to the originating processor (block 160).

A miss in the protected cache on the local node, however, causes the processing logic, in issuing an access request to the remote node for the data (block 165), to first confirm that the access request is in fact to a node in the same ECCN as the local node from which the memory access originated (block 170). If it is not in the same ECCN, then an error condition has occurred (block 175). The processor is attempting to access protected memory outside of its ECCN. Advantageously, an interrupt will be sent to the originating processor notifying the processor of the error condition.

On the other hand, if the remote node is confirmed in block 170 as being in the same ECCN as the local node from which the access request originated, the processing logic next confirms that the access request is to the protected region of the remote node (block 180). If it is not, then again an error condition has occurred, and advantageously an interrupt is sent to the originating processor to notify it of the error condition (block 185). If, however, the processing logic in block 180 confirms that the access request is in fact to a protected region of the remote node, then the appropriate address in that protected region is accessed, and the data is forwarded to the originating processor of the local node (block 190). The local node encaches the return data in its protected cache (block 192), and the data is returned to the processor (block 194).

It will be appreciated that by configuring network cache in this way, protected cache 21 for a particular node 10 on FIG. 1 can only be written to by nodes also on the same ECCN. The logic step 170 on FIG. 2B creates an error condition whenever protected memory is attempted to be accessed outside the local ECCN. Therefore, protected cache is restricted from being written to from outside the local ECCN. In this way, if it becomes necessary to purge protected memory because of a memory error, purging of protected caches can be limited to nodes in the same ECCN as the node in error. Also, unprotected caches need not be purged since under logic step 192 on FIG. 2B, protected data is only written to protected cache.

It will be further appreciated that logic of the present invention may be embodied on software executable on a computer having one or more processing units, a memory, and a computer-readable mass storage device.

Although the present invention and its advantages have been described in detail, it should be understood that various changes, substitutions and alterations can be made herein without departing from the spirit and scope of the invention as defined by the appended claims.

I claim:

1. A method for containing memory errors in a multiprocessor computer system having a network cache environment, the system comprising a plurality of nodes grouped into error containment clusters thereof, each node having protected and unprotected main memory, access to each node's unprotected main memory available to processors on all other nodes, access to each node's protected main memory restricted to processors within the same error containment cluster, the method comprising the steps of:

(a) providing each node with protected cache and unprotected cache;

(b) restricting access to each node's unprotected cache to data stored in unprotected main memory; and (c) restricting access to each node's protected cache to data stored in protected main memory in the same error containment cluster.

2. The method of claim 1, in which step (b) includes the substeps of:

(i) detecting a processor request from a local node;

(ii) retrieving data responsive to the processor request if the data is stored on the local node;

(iii) if the data is not stored on the local node, (1) identifying a remote node on which the data is stored, and (2) determining whether the data resides in protected or unprotected main memory on the remote node;

(iv) when the data resides on unprotected main memory on the remote node, checking the local unprotected cache;

(v) retrieving the data if substep (iv) is a hit;

(vi) if substep (iv) is a miss, issuing an unprotected access request to the remote node for the data; and (vii) forwarding the data to the local node if the unprotected access request is to unprotected main memory on the remote node.

3. The method of claim 2, in which substep (vii) includes the substeps of encaching the data in the local unprotected cache and then retrieving the data.

4. The method of claim 2, further comprising the substep of:

(viii) returning an error to the local node if the unprotected access request is not to unprotected main memory on the remote node.

5. The method of claim 1, in which step (c) includes the substeps of:

(i) detecting a processor request from a local node;

(ii) retrieving data responsive to the processor request if the data is stored on the local node;

(iii) if the data is not stored on the local node, (1) identifying a remote node on which the data is stored, and (2) determining whether the data resides in protected or unprotected main memory on the remote node;

(iv) when the data resides on protected main memory on the remote node, checking the local protected cache;

(v) retrieving the data if substep (iv) is a hit;

(vi) if substep (iv) is a miss, issuing a protected access request to the remote node for the data;

(vii) confirming that the remote node is in the same error containment cluster as the local node; and (viii) forwarding the data to the local node if the protected access request is to protected main memory on the remote node.

6. The method of claim 5, in which substep (vii) includes the substep of returning an error to the local node if the remote node is not in the same error containment cluster as the local node.

7. The method of claim 5, in which substep (viii) includes the substeps of encaching the data in the local protected cache and then retrieving the data.

8. The method of claim 5, further comprising the substep of:

(ix) returning an error to the local node if the protected access request is not to protected main memory on the remote node.

9. A method for containing memory errors in a multiprocessor computer system having a network cache environment, the system comprising a plurality of nodes grouped into error containment clusters thereof, each node having protected and unprotected main memory, access to each node's unprotected main memory available to processors on all other nodes, access to each node's protected main memory restricted to processors within the same error containment cluster, the method comprising the steps of:

(a) providing each node with protected cache and unprotected cache;

(b) detecting a processor request from a local node;

(c) retrieving data responsive to the processor request if the data is stored on the local node;

(d) if the data is not stored on the local node, (1) identifying a remote node on which the data is stored, and (2) determining whether the data resides in protected or unprotected main memory on the remote node;

(e) when the data resides on unprotected main memory on the remote node, checking the local unprotected cache;

(f) retrieving the data if step (e) is a hit;

(g) if step (e) is a miss, issuing an unprotected access request to the remote node for the data;

(h) forwarding the data to the local node if the unprotected access request is to unprotected main memory on the remote node, said step (h) including the substeps of encaching the data in the local unprotected cache and then retrieving the data;

(i) returning an error to the local node if the unprotected access request is not to unprotected main memory on the remote node;

(j) when the data resides on protected main memory on the remote node, checking the local protected cache;

(k) retrieving the data if step (j) is a hit;

(l) if step (j) is a miss, issuing a protected access request to the remote node for the data;

(m) confirming that the remote node is in the same error containment cluster as the local node, said step (m) including the substep of returning an error to the local node if the remote node is not in the same error containment cluster as the local node;

(n) forwarding the data to the local node if the protected access request is to protected main memory on the remote node, said step (n) including the substeps of encaching the data in the local protected cache and then retrieving the data; and (o) returning an error to the local node if the protected access request is not to protected main memory on the remote node.

10. A memory management system, comprising:

a multiprocessor computer system having a plurality of interconnected nodes grouped into error containment clusters thereof, each node having protected and unprotected main memory, each node further having protected cache and unprotected cache;

means for making access to each node's unprotected main memory available to processors on all other nodes;

means for restricting access to each node's protected main memory to processors within the same error containment cluster;

means for restricting access to each node's unprotected cache to data stored in unprotected main memory; and means for restricting access to each node's protected cache to data stored in protected main memory in the same error containment cluster.

11. The memory management system of claim 10, in which the means for restricting access to each node's unprotected cache to data stored in unprotected main memory comprises:

means for detecting a processor request from a local node;

means for retrieving data responsive to the processor request if the data is stored on the local node;

means for identifying a remote node on which the data is stored, and for determining whether the data resides in protected or unprotected main memory on the remote node, if the data is not stored on the local node;

means for checking the local unprotected cache when the data resides on unprotected main memory on the remote node;

means for retrieving the data if the data resides on unprotected main memory on the remote node;

means for issuing an unprotected access request to the remote node for the data if the data does not reside on unprotected main memory on the remote node; and means for forwarding the data to the local node if the unprotected access request is to unprotected main memory on the remote node.

12. The memory management system of claim 11, in which the means for forwarding the data to the local node if the unprotected access request is to unprotected main memory on the remote node comprises:

means for encaching the data in the local unprotected cache and then retrieving the data.

13. The memory management system of claim 11, in which the means for restricting access to each node's unprotected cache to data stored in unprotected main memory further comprises:

means for returning an error to the local node if the unprotected access request is not to unprotected main memory on the remote node.

14. The memory management system of claim 10, in which the means for restricting access to each node's protected cache to data stored in protected main memory in the same error containment cluster comprises:

means for detecting a processor request from a local node;

means for retrieving data responsive to the processor request if the data is stored on the local node;

means for identifying a remote node on which the data is stored, and determining whether the data resides in protected or unprotected main memory on the remote node, if the data is not stored on the local node;

means for checking the local protected cache when the data resides on protected main memory on the remote node;

means for retrieving the data if the data reside on protected main memory on the remote node;

means for issuing a protected access request to the remote node for the data if the data does not reside on protected main memory on the remote node;

means for confirming that the remote node is in the same error containment cluster as the local node; and means for forwarding the data to the local node if the protected access request is to protected main memory on the remote node.

15. The memory management system of claim 14, in which the means for confirming that the remote node is in the same error containment cluster as the local node comprises:

means for returning an error to the local node if the remote node is not in the same error containment cluster as the local node.

16. The memory management system of claim 14, in which the means for forwarding the data to the local node if the protected access request is to protected main memory on the remote node comprises:

means for encaching the data in the local protected cache and then retrieving the data.

17. The memory management system of claim 16, wherein the means for restricting access to each node's protected cache to data stored in protected main memory in the same error containment cluster further comprises:

means for returning an error to the local node if the protected access request is not to protected main memory on the remote node.

18. A computer program product including computer readable logic recorded thereon for containing memory errors in a multiprocessor computer system having a network cache environment, the computer system having a plurality of interconnected nodes grouped into error containment clusters thereof, each node having protected and unprotected main memory, each node further having protected cache and unprotected cache, the computer program product comprising:

a computer-readable storage medium; and a computer program stored on the computer-readable storage medium, the computer program comprising:

means for making access to each node's unprotected main memory available to processors on all other nodes;

means for restricting access to each node's protected main memory to processors within the same error containment cluster;

means for restricting access to each node's unprotected cache to data stored in unprotected main memory; and means for restricting access to each node's protected cache to data stored in protected main memory in the same error containment cluster.

19. The computer program product of claim 18, in which the means for restricting access to each node's unprotected cache to data stored in unprotected main memory comprises:

means for detecting a processor request from a local node;

means for retrieving data responsive to the processor request if the data is stored on the local node;

means for identifying a remote node on which the data is stored, and for determining whether the data resides in protected or unprotected main memory on the remote node, if the data is not stored on the local node;

means for checking the local unprotected cache when the data resides on unprotected main memory on the remote node;

means for retrieving the data if the data resides on unprotected main memory on the remote node;

means for issuing an unprotected access request to the remote node for the data if the data does not reside on unprotected main memory on the remote node; and means for forwarding the data to the local node if the unprotected access request is to unprotected main memory on the remote node.

20. The computer program product of claim 19, in which the means for forwarding the data to the local node if the unprotected access request is to unprotected main memory on the remote node comprises:

means for encaching the data in the local unprotected cache and then retrieving the data.

21. The computer program product of claim 19, in which the means for restricting access to each node's unprotected cache to data stored in unprotected main memory further comprises:

means for returning an error to the local node if the unprotected access request is not to unprotected main memory on the remote node.

22. The computer program product of claim 18, in which the means for restricting access to each node's protected cache to data stored in protected main memory in the same error containment cluster comprises:

means for detecting a processor request from a local node;

means for retrieving data responsive to the processor request if the data is stored on the local node;

means for identifying a remote node on which the data is stored, and determining whether the data resides in protected or unprotected main memory on the remote node, if the data is not stored on the local node;

means for checking the local protected cache when the data resides on protected main memory on the remote node;

means for retrieving the data if the data reside on protected main memory on the remote node;

means for issuing a protected access request to the remote node for the data if the data does not reside on protected main memory on the remote node;

means for confirming that the remote node is in the same error containment cluster as the local node; and means for forwarding the data to the local node if the protected access request is to protected main memory on the remote node.

23. The computer program product of claim 22, in which the means for confirming that the remote node is in the same error containment cluster as the local node comprises:

means for returning an error to the local node if the remote node is not in the same error containment cluster as the local node.

24. The computer program product of claim 22, in which the means for forwarding the data to the local node if the protected access request is to protected main memory on the remote node comprises:

means for encaching the data in the local protected cache and then retrieving the data.

25. The computer program product of claim 22, wherein the means for restricting access to each node's protected cache to data stored in protected main memory in the same error containment cluster further comprises:

means for returning an error to the local node if the protected access request is not to protected main memory on the remote node.

* * * * *

UNITED STATES PATENT AND TRADEMARK OFFICE
CERTIFICATE OF CORRECTION

PATENT NO. : 6,081,876
DATED : June 27, 2000
INVENTOR(S) : Tony M. Brewer et al.

It is certified that error appears in the above-identified patent and that said Letters Patent is hereby corrected as shown below:

Column 8,
Line 56, delete "claim 16" and insert therefor -- claim 14 --

Signed and Sealed this

Ninth Day of July, 2002

Attest:

JAMES E. ROGAN
Attesting Officer  Director of the United States Patent and Trademark Office